(12) United States Patent
Zornhagen et al.

(10) Patent No.: US 8,757,880 B2
(45) Date of Patent: Jun. 24, 2014

(54) TRIPOD ROLLING ELEMENT WITH SPRING RING

(71) Applicant: Volkswagen AG, Wolfsburg (DE)

(72) Inventors: Marco Zornhagen, Wolfenbuettel (DE); Alexander Mick, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 13/905,809

(22) Filed: May 30, 2013

(65) Prior Publication Data

US 2013/0260902 A1 Oct. 3, 2013

Related U.S. Application Data

(63) Continuation of application No. PCT/EP2011/005480, filed on Oct. 29, 2011.

(30) Foreign Application Priority Data

Dec. 4, 2010 (DE) .......................... 10 2010 053 480

(51) Int. Cl.
*F16C 29/04* (2006.01)
*F16C 3/24* (2006.01)
*F16D 3/205* (2006.01)

(52) U.S. Cl.
USPC ............................................ 384/54; 464/132

(58) Field of Classification Search
USPC ......... 464/111, 120–123, 128–130, 132, 905; 384/54, 57
See application file for complete search history.

(56) References Cited

U.S. PATENT DOCUMENTS

| 2,354,445 | A | * | 7/1944 | Grubbs | |
| 2,752,766 | A | * | 7/1956 | Wildhaber | ............... 464/132 X |
| 2,760,359 | A | | 8/1956 | Wildhaber | |
| 4,828,534 | A | * | 5/1989 | Orain | ............................ 464/111 |
| 5,073,144 | A | | 12/1991 | Stenglein et al. | |
| 7,018,297 | B2 | * | 3/2006 | Henkel et al. | .................. 464/111 |
| 7,160,194 | B2 | * | 1/2007 | Olszewski et al. | ............ 464/111 |

FOREIGN PATENT DOCUMENTS

| DE | 34 40 105 A1 | 5/1985 |
| DE | 37 41 049 A1 | 7/1988 |
| DE | 10 2007 059 378 A1 | 6/2009 |
| DE | 102007059378 A1 * | 6/2009 |
| GB | 2 199 638 A | 7/1988 |

OTHER PUBLICATIONS

"Compression Spring—End Types." Spring-l-Pedia. Mar. 2, 2011, [online], [retrieved on Jul. 24, 2013] Retrieved from the Internet <URL: http://web.archive.org/web/20110203083125/http://springipedia.com/compression-end-types.asp>.*
"Around." The Free Dictionary. [retrieved on Sep. 23, 2013] Retrieved from the Internet <URL: http://www.thefreedictionary.com/around>.*
The International Search Report dated Jan. 18, 2013, in PCT/EP2011/005480.

* cited by examiner

*Primary Examiner* — Gregory Binda
*Assistant Examiner* — Josh Skroupa
(74) *Attorney, Agent, or Firm* — Muncy, Geissler, Olds & Lowe, P.C.

(57) ABSTRACT

A rolling element of a tripod joint and a tripod joint which has a rolling element is provided. In the rolling element, an annular spring element is provided which spreads the housing inner body and a first housing part and a second housing part of the rolling element apart and presses rolling bodies of the rolling element against raceways of the outer part of the tripod joint.

16 Claims, 4 Drawing Sheets

TRIPOD ROLLING ELEMENT WITH SPRING RING

This nonprovisional application is a continuation of International Application No. PCT/EP2011/005480, which was filed on Oct. 29, 2011, and which claims priority to German Patent Application No. DE 10 2010 053 480.3, which was filed in Germany on Dec. 4, 2010, and which are both herein incorporated by reference.

BACKGROUND OF THE INVENTION

1. Field of the Invention

The present invention relates to a rolling element of a tripod joint, and also relates to a tripod joint that has at least one rolling element, wherein the rolling element has a housing having at least a first and a second housing part and a housing inner body, and has rolling bodies that are designed to support mutually opposing raceways of a joint outer part of the tripod joint. The housing inner body of the housing additionally has a receptacle opening for supporting a journal of a tripod star of the tripod joint.

2. Description of the Background Art

Using tripod joints, it is possible to transmit a torque from an input shaft to an output shaft. The axes of the shafts can enclose an obtuse angle together with one another when tripod joints are used. A tripod joint has an inner part and an outer part, with each part being connected to one of the two shafts. The rolling bodies of the tripod rolling elements bring about the transmission of force between the two shafts. The rolling bodies rest against running surfaces of the tripod rolling elements and also against running surfaces of the joint outer parts. The rolling bodies can be held on the tripod rolling elements by means of roller cages. Oftentimes, a certain manufacturing-related distance exists between the rolling bodies of the tripod rolling elements and the running surfaces of the outer part of the tripod joint. Consequently, the rolling bodies do not continuously contact the running surfaces of the outer part of the tripod joint. This can lead to noise generation, especially in the event of a change in the direction of load of the input shaft.

From DE 10 2007 059 378 A1, which is incorporated herein by reference, a tripod rolling element is known in which the housing of the rolling element is made of multiple parts, and the housing parts of the housing are braced against the housing inner body of the housing by multiple elastically resilient elements. In this way, the rolling bodies are pressed against the associated raceways on the outer part of the tripod joint.

In the conventional art, in which multiple elastically resilient elements brace the housing parts against the housing inner body, it is complicated to produce, however, and places stringent requirements on precision of implementation. Moreover, the multiple elastically resilient elements represent a difficulty in assembling the tripod rolling element.

SUMMARY OF THE INVENTION

It is therefore an object of the present invention to provide a tripod rolling element of a tripod joint, and to provide a tripod joint with such a rolling element, that have improved acoustic characteristics. Moreover, the rolling element according to the invention is simple and economical to produce and assemble.

According to a first aspect of the invention, the object is attained by a rolling element of a tripod joint. A rolling element of a tripod joint that is designed in accordance with an embodiment of the invention has a housing with a first housing part, a second housing part, and a housing inner body. The housing inner body is held between the first and second housing parts and has a receptacle opening for supporting a journal of a tripod star of the tripod joint. The two housing parts of this design are of course designed such that they do not cover the receptacle opening in the housing inner body. The two housing parts have raceways with which are associated rolling bodies that are designed to support the rolling element on mutually opposing raceways of a joint outer part of the tripod joint. The housing inner body is additionally held in a groove-like receptacle in each of the first and second housing parts.

Alternatively, the two housing parts can be held in a groove-like receptacle in the housing inner body. In this design, outer regions of the housing inner body surround the two housing parts. The groove-like receptacle of the housing inner body can be circumferential in design. The positive retention of the housing inner body in the two housing parts efficaciously prevents the housing part from falling out of the housing.

Furthermore, an annular spring element can be provided between the housing inner body and the first and second housing parts that braces the housing parts against the housing inner body in order to press the rolling bodies against the associated raceways of the joint outer part. As a result, the rolling bodies rest against the raceways of the housing parts and also the raceways of the joint outer parts, so noise generation can thus be prevented, especially in the event of a change in the direction of load of the input shaft. The annular spring element in this design is held in a recess on the outside of the housing inner body and/or in a recess in each of the groove-like receptacles in the housing parts. If the recess in this design is provided in the groove-like receptacles in the housing parts, it can likewise be groove-like in design.

In an embodiment of the invention with a recess for retaining the annular spring element on the outside of the housing inner body, the recess can likewise be designed as a groove-like receptacle, or as a shoulder on one of the outer edges of the housing inner body. In order to ensure uniform distribution of the spring force of the annular spring element on the housing parts, provision can be made to design the recesses for holding the annular spring element in the housing parts and/or the housing inner body to be centered with respect to the extent of the housing along the journal of the tripod star. In this way, tilting and/or angling of the rolling element according to the invention relative to the journal of the tripod star can be avoided.

In an embodiment of the invention, provision can be made for the annular spring element of the rolling element to be made of spring steel sheet or spring wire. An annular spring element can be manufactured easily and economically from these materials. By varying the material used and/or the thickness of the material used, the spring preload, and hence the spring rate, of the annular spring element can likewise be varied in a very simple way and hence adapted to different requirements.

In addition, in another embodiment of the rolling element, provision can be made for the annular spring element to have a corrugated profile. As a result of this simple, mechanical shape of the annular spring element, simply varying the number and/or the shape of the corrugations can likewise adapt the spring preload, and hence the spring rate, to the demands placed on the tripod joint. Thus, for example, a higher spring rate can be achieved simply with a higher number of corrugations. Consequently, a tripod joint with different damping characteristics is produced with otherwise identical components, in particular those in the housing parts and housing inner body.

An exemplary embodiment of the rolling element provides for the flanks of a corrugation of the corrugated profile to be linear and for the transitions between pairs of flanks to be rounded. Alternatively, the flanks of a corrugation of the corrugated profile can be curved in design. Additional geometries, such as, e.g., a sawtooth profile, are likewise possible for the annular spring element. As a result of the broad scope for design of the corrugated profile, prefabricated spring elements may also be used as annular spring elements. This results in an additional reduction in costs for manufacturing the rolling element and hence the tripod joint.

In an embodiment of the invention, provision can be made for the annular spring element of the rolling element to be a slotted damping ring. The slot in the spring ring is primarily useful in assembly of the annular spring element. The slot facilitates assembly of the component in one variant embodiment in particular, in which the annular spring element is held in a recess, in particular a groove-like recess, on the outside of the housing inner body. To this end, the annular spring element is bent upward slightly and pushed over the housing inner body into its recess. In the recess, the annular spring element snaps back out of its bent position and is consequently held in a positive-locking manner in the recess of the housing inner part. This recess can be designed such that the annular spring element is compressed in such a way under load that it disappears completely into the recess of the housing inner part. The housing inner part thus rests directly against a housing part and can directly pass along the force of the input shaft. This improves force transmission by the tripod joint.

In addition, according to another embodiment of the rolling element, provision can be made for the slotted damping ring to be multilayered in implementation. A multilayered, in particular double-layered, damping ring can be implemented as a single piece in this design. A multilayered damping ring has the advantage that relative motion occurs between the spring layers in the event of a load change, for example a change in the direction of rotation of the input shaft. In this event, additional friction is produced, by which means noises generated by an abrupt load change can be damped even more highly.

Another alternative embodiment of the invention provides for the multilayered damping ring of the rolling element to be implemented such that it can be wound in a spiral. In this type of construction, the material of the annular spring element can be wound in an overlapping spiral from the inside to the outside. As a result of this very simple mode of manufacture, it is additionally possible to reduce production expenses, and hence to save costs.

In an alternative embodiment of the rolling element according to the invention, the annular spring element can be a closed damping ring. In this embodiment, an especially uniform distribution of spring force over the entire circumference of the annular spring element can be achieved. Since it is not possible in a closed spring ring to bend it upward for assembly as in the slotted spring ring, two alternative installation options, or a combination thereof, are possible. In the first option, the closed spring ring is pushed onto the housing inner body, whose outer surface is cylindrical, and a recess for accommodating the annular spring element is provided in each of the groove-like receptacles of the housing parts. Alternatively, the inner ring can be designed with a shoulder at an outside edge. The closed spring ring is held securely in this recess created by the shoulder. A combination of the two retaining options is likewise possible.

In another embodiment of the invention, provision can be made on the rolling element for a second annular spring element that is substantially identical in construction or designed differently from the annular spring element to be located parallel to the annular spring element in the rolling element. The second annular spring element in this design is held in a second recess on the outside of the housing inner body and/or in a second recess in each of the groove-like receptacles of the housing parts. Due to the use of a second annular spring element, the spring force in the event of a load change, for example a change in the direction of rotation of the input shaft, can be distributed better without forfeiting the advantages of an annular spring element, especially the advantages in assembly. The identical construction of the two annular spring elements produces a very uniform load distribution.

In an embodiment of the invention, provision can be made for the distance of the annular spring element from a first side of the two housing parts to be equal to the distance of the second annular spring element from the second side, opposite the first side, of the two housing parts. As a result of this design, the two annular spring elements are placed symmetrically in the housing. Tilting of the housing about the journals of the tripod joint, in particular in the event of a load change caused by a change in the direction of rotation of the input shaft, can be avoided in this way. All the advantages from the use of an annular spring element are preserved in this embodiment of the invention, as well.

According to a second aspect of the invention, the object is attained by a tripod joint, in particular a linear tripod joint. The tripod joint here has a tripod star with radially projecting journals, a joint outer part, and rolling elements with rolling bodies. The rolling elements are provided with at least one of the features according to the first aspect of the invention described herein. The advantages described herein for the rolling elements thus also ensue, of course, for the tripod joint that has corresponding rolling elements.

Additional advantages, features, and details of the invention are evident from the description below, in which exemplary embodiments of the invention are described in detail with reference to the drawings. The features mentioned in the claims and in the description can be essential to the invention individually or in any desired combination.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
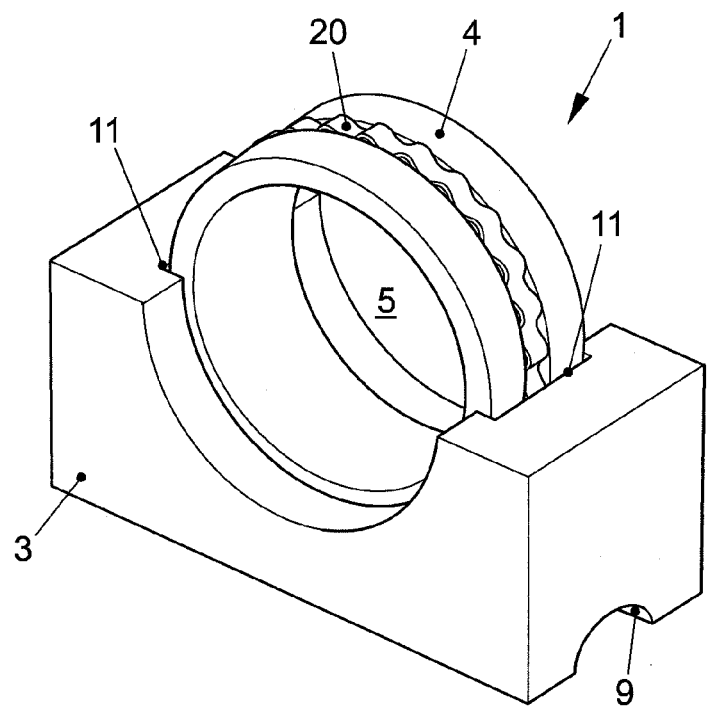
FIG. 1 is a perspective view of a rolling element according to the invention without the first housing part.

In FIGS. 1-7 elements with identical function and action have the same reference characters.

FIG. 1 schematically shows a rolling element 1 according to an embodiment of the invention in a perspective view. For the purpose of clearer illustration, the first housing part 2 is not shown. The housing inner body 4 is securely held on the second housing part 3 in a groove-like receptacle 11 in the second housing part 3. The housing inner body 4 additionally has a cylindrical receptacle 5 for the journals of a tripod joint. Provided on the housing inner body 4 is an annular spring element 20, which braces the housing inner body 4 against the first and second housing parts 2, 3. In this way, the rolling bodies that are placed in the raceways 8, 9 on the first and second housing parts 2, 3 are pressed against raceways on the outer part of the tripod joint. As a result, the rolling bodies 6 (not shown) are always in contact with the raceways of the housing parts 2, 3 and also the raceways of the outer housing part. Noise generation, including and especially in the event of a change in the direction of load of the input shaft, can thus be reliably prevented. In the embodiment shown, the annular spring element 20 is held in a recess on the housing inner body 4. Retention of the annular spring element 20 in a recess in the groove-like receptacles 10, 11 in the housing parts 2, 3 is likewise possible. The use of an annular spring element 20 to brace the housing parts 2, 3 against the housing inner body 4 is mechanically simple and allows for easy and economical manufacture and assembly.

Figure 2:
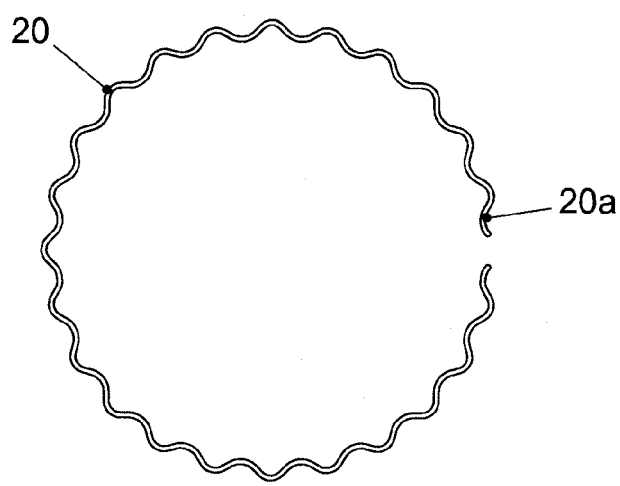
FIG. 2 is a side view of a slotted damping ring.

FIG. 2 shows a slotted damping ring 20a. A slotted damping ring 20a of this nature can be used as the annular spring element 20, for example in an embodiment of the rolling element 1 such as is shown in FIG. 1. The spring force of the annular spring element 20 can be adjusted to different requirements in a simple manner by varying the number and height of the corrugations of this slotted damping ring 20a.

Figure 3:
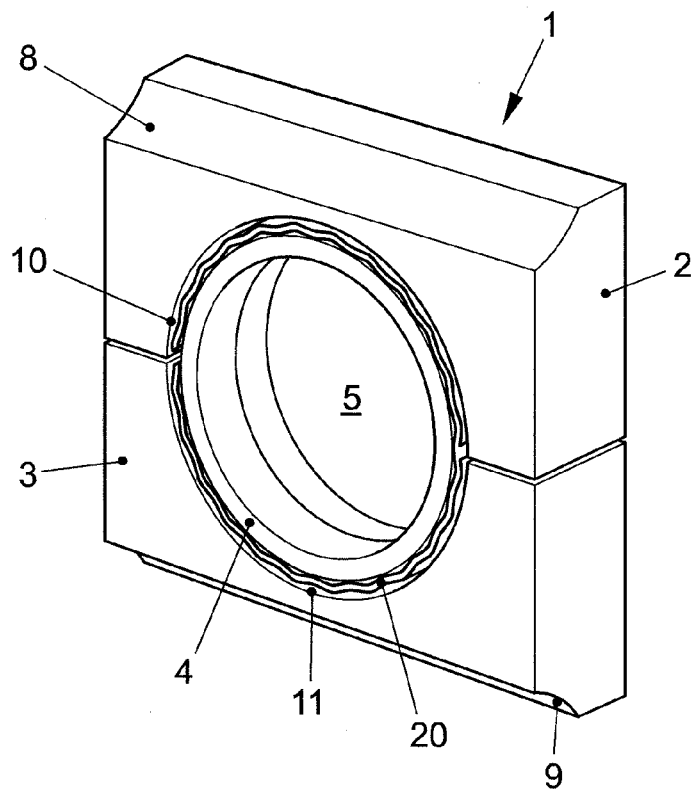
FIG. 3 is a perspective sectional view of another embodiment of the rolling element according to the invention.

FIG. 3 schematically shows a perspective, sectional representation of another embodiment of a rolling element 1 according to the invention. The cross-section here is centered relative to the receptacle 5 for the journals of the tripod joint and is perpendicular to its longitudinal axis. The rolling element 1 according to the invention has a first housing part 2, a second housing part 3, and a housing inner body 4. The housing inner body 4 is held in the groove-like receptacles 10, 11 in the two housing parts 2, 3. Located on the housing parts 2, 3 are raceways 8, 9 for rolling bodies 6 (not shown in the illustration). The two housing parts 2, 3 are braced against the housing inner body 4 by an annular spring element 20. In consequence, the rolling bodies 6 rest against the raceways of the outer part of the tripod joint. As a result, the rolling bodies 6 are always in contact with a housing part 2, 3 and also with the joint outer part of the tripod joint. Noise generation during operation of the tripod joint can be avoided in this way.

Figure 4:
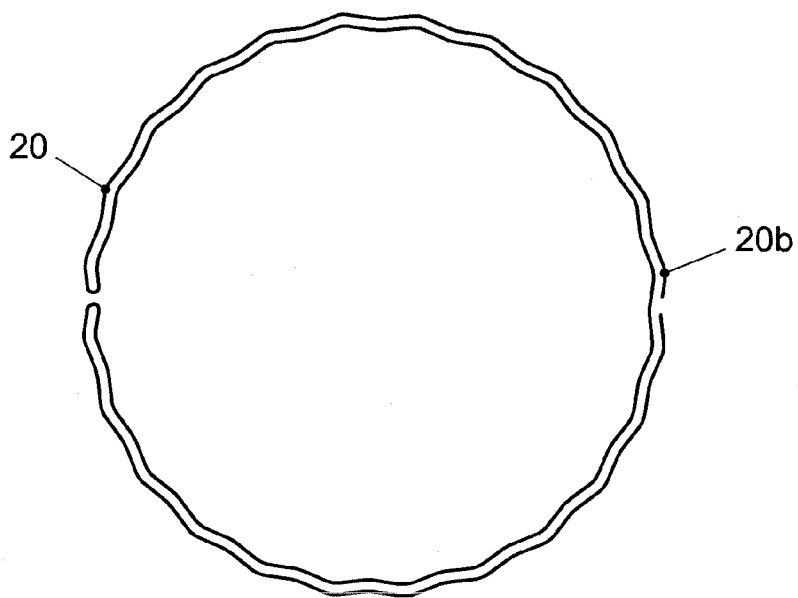
FIG. 4 is a side view of a multilayered damping ring.

FIG. 4 shows a multilayered damping ring 20b, which is used as the annular spring element 20 in the rolling element 1 shown in FIG. 3. A double-layered, curved damping ring 20b implemented as a single piece has the advantage that relative motion occurs between the spring layers during a spring motion, for example in the event of a change in the direction of rotation of the input shaft. In the case of a multilayered damping ring 20b, this produces additional friction between the layers, which can damp even more highly the noise generated by abrupt load changes during operation of the tripod joint.

Figure 5:
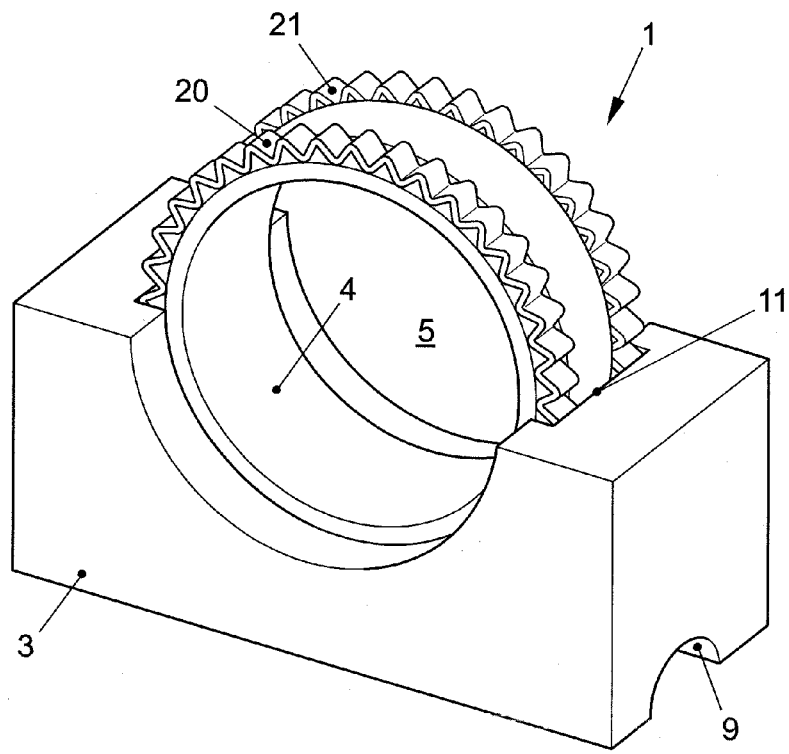
FIG. 5 is a perspective view of a third embodiment of the rolling element according to the invention without the first housing part.

Shown in FIG. 5 is another embodiment of a rolling element 1 according to the invention, in which a second annular spring element 21 is used in addition to a first annular spring element 20. The spring elements 20, 21 in this embodiment are held in shoulders at the outer edges of the housing inner body 4. The inside edges and inside surface of the housing inner body 4 define the receptacle 5 for the journal of the tripod joint. In this cross-sectional representation, it can also be seen that the housing inner body 4 is held in a groove-like receptacle 11 in the second housing part 3. The first housing part 2, which has a groove-like receptacle 10 complementary to the groove-like receptacle 11, and which likewise encloses the housing inner body 4, is not shown. The second housing part 3 additionally has a raceway 9 for rolling bodies 6 that are not shown. Due to the spring action of the annular spring elements 20, 21, the housing inner body 4 is braced against the two housing parts 2, 3 and consequently the rolling bodies 6 are pressed against the raceways at the outer part of the tripod joint. The annular spring elements 20, 21 are placed symmetrically with respect to the center of the housing inner part 4, and hence to the center of the rolling element 1. As a result, the load is distributed uniformly over the two annular spring elements 20, 21. Tilting and/or angling of the rolling element 1 according to the invention relative to the journal of the tripod star can be avoided in this way. Noise generation during operation of the tripod joint can be suppressed in this embodiment of the rolling element 1 according to the invention as well.

Figure 6:
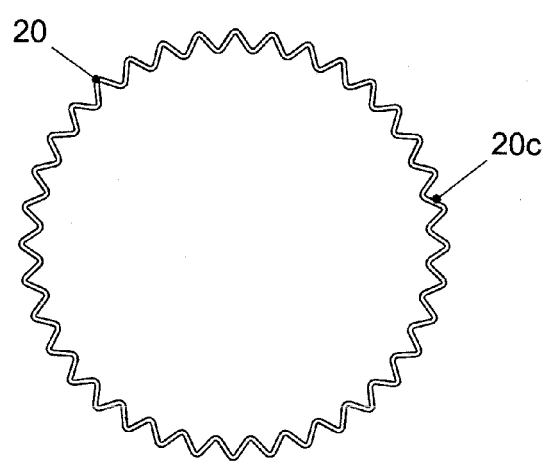
FIG. 6 is a side view of a closed damping ring.

FIG. 6 shows a closed damping ring 20c, which is used as the annular spring element 20 and second annular spring element 21 in the embodiment of the rolling element 1 according to the invention shown in FIG. 5. The closed type of construction of the closed damping ring 20c produces especially good force distribution along the annular spring element 20.

Figure 7:
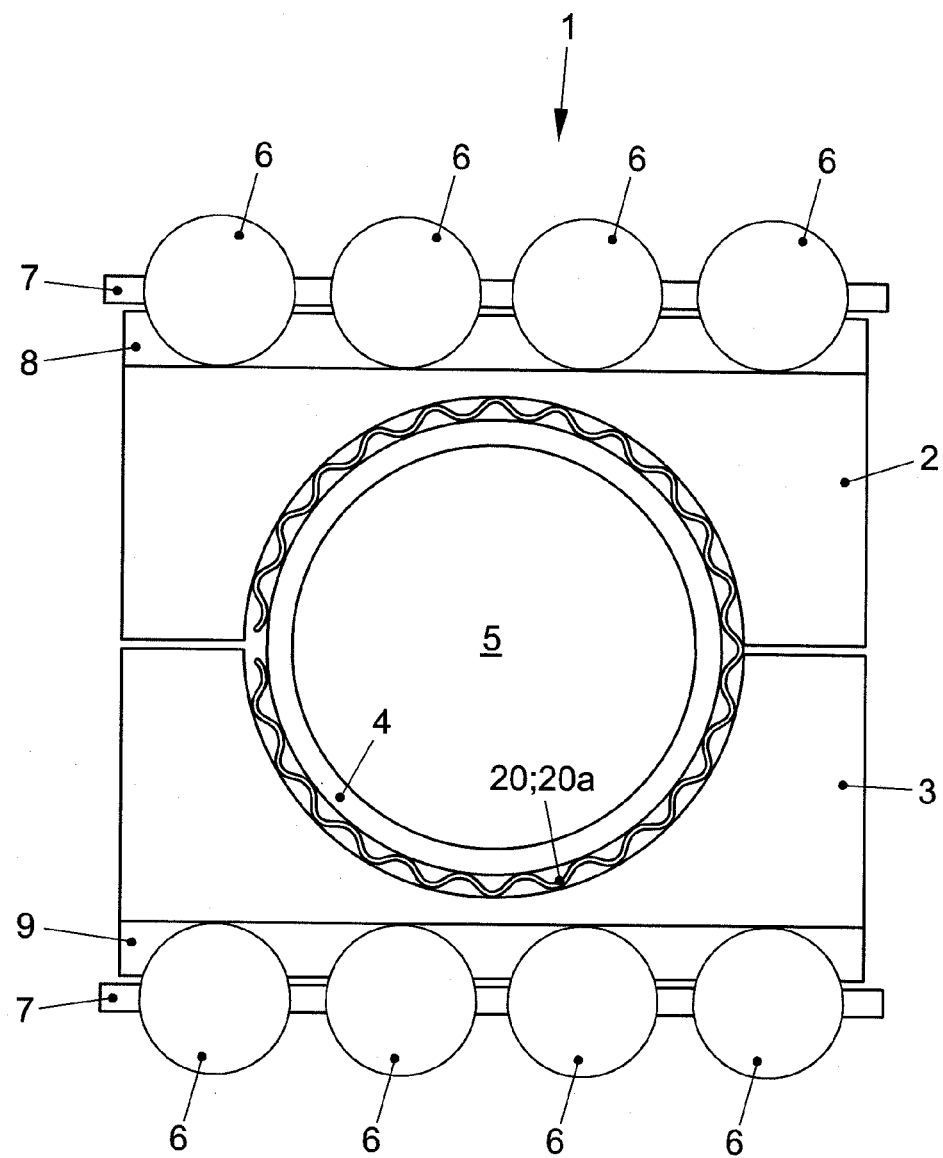
FIG. 7 is a side view of a sectional drawing of another embodiment of a rolling element according to the invention.

FIG. 7 shows a schematic sectional drawing through an alternative rolling element 1 according to the invention. The first and second housing parts 2, 3 are placed around the housing inner body 4, which has in the center a receptacle 5 for the journal of the tripod joint. Located between the housing inner body 4 and the two housing parts 2, 3 is an annular spring element 20, which in this embodiment is constructed as a slotted damping ring 20a. Located on the raceways 8, 9 of the first and second housing parts 2, 3 are rolling bodies 6. These rolling bodies 6 are held by roller cages 7. As a result of the spring force of the annular spring element 20, 20a, the two housing parts 2, 3 are braced against the housing inner body 4, and consequently the rolling bodies 6 are pressed against raceways on the outer part of the tripod joint (not shown). The rolling bodies 6 thus rest against the raceways of the outer part of the tripod joint at all times. The generation of noise, even during a change in the direction of load of the input shaft, can be efficaciously avoided as a result. Due to the use of an annular spring element 20 of this nature, which represents a mechanically simple component, overall manufacture and assembly of the rolling element according to the invention is simplified. Manufacturing and assembly costs can be reduced.

The invention was explained in detail above using preferred exemplary embodiments. However, it is not limited to these exemplary embodiments, but instead includes all embodiments defined by the patent claims. For example, the two housing parts can also be held in a groove-like receptacle of the housing inner body. In this design, outer regions of the housing inner body, in particular plate-like regions, at least partially surround the two housing parts.

Without referring to an embodiment of the rolling element according to the invention, the use of an annular spring element in general yields numerous advantages. Thus, only one annular spring element is necessary in any rolling element. This spring element can be installed very simply in the recesses at the outside of the housing inner body and/or in the groove-like receptacles of the housing parts. Thus very little installation space is required. The recesses can be designed such that the annular spring element descends into the recesses during a torque transmission, and the housing inner body consequently rests directly against the applicable nearer housing part. As a result, the annular spring element is protected against overloading, for example breakage or plastic deformation. The friction of the annular spring element on the housing inner part and on the housing parts causes a damping which, in addition to the contact of the rolling bodies with the raceways of the rolling element and of the outer part of the tripod joint, leads to further suppression of load-change-induced noise, and consequently results in improved comfort behavior of a tripod joint with rolling elements according to the invention. It is easily possible to vary the spring rate, or respectively the spring load, by changing the spring cross-section and/or the spring geometry, in particular by changing the number and/or shape of the corrugations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rolling element of a tripod joint, the rolling element comprising:
   a housing with a first housing part;
   a second housing part;
   a housing inner body that is held between the first and second housing parts;
   a receptacle opening adapted to support a journal of a tripod star of the tripod joint;
   at least two rolling bodies associated with the first and second housing parts, the at least two rolling bodies being adapted to support mutually opposing raceways of a joint outer part of the tripod joint;
   a groove-like receptacle adapted to hold the housing inner body in each of the first and second housing parts; and
   an annular spring element arranged between the housing inner body and the first and second housing parts, the annular spring element being held in a recess, the annular spring element being configured to brace the first and second housing parts against the housing inner body in order to press the rolling bodies against an associated raceway of the joint outer part, the annular spring element encircling the housing inner body.

2. The rolling element according to claim 1, wherein the annular spring element is made of spring steel sheet or spring wire.

3. The rolling element according to claim 1, wherein the annular spring element has a corrugated profile.

4. The rolling element according to claim 3, wherein flanks of a corrugation of the corrugated profile are linear and transitions between pairs of flanks are rounded, or wherein the flanks of a corrugation of the corrugated profile are curved in design.

5. The rolling element according to claim 1, wherein the annular spring element is a slotted damping ring.

6. The rolling element according to claim 5, wherein the slotted damping ring is multilayered.

7. The rolling element according to claim 1, wherein the annular spring element is a closed damping ring.

8. The rolling element according to claim 1, wherein a second annular spring element is provided that is substantially identical in construction or designed differently from the annular spring element, the second annular spring element being arranged parallel to the annular spring element, wherein the second annular spring element is held in a second recess.

9. The rolling element according to claim 8, wherein a distance of the annular spring element from a first side of the two housing parts is equal to a distance of the second annular spring element from a second side, opposite the first side, of the first and second housing parts.

10. A tripod joint comprising:
    at least two rolling elements with rolling bodies,
    wherein one rolling element of the at least two rolling elements is the rolling element according to claim 1.

11. The rolling element according to claim 1, wherein the recess is disposed around an outer circumference of the housing inner body.

12. A rolling element of a tripod joint, the rolling element comprising:
    a housing with a first housing part;
    a second housing part;
    a housing inner body that is held between the first and second housing parts;
    a receptacle opening adapted to support a journal of a tripod star of the tripod joint;
    at least two rolling bodies associated with the first and second housing parts, the at least two rolling bodies being adapted to support mutually opposing raceways of a joint outer part of the tripod joint;
    a groove-like receptacle adapted to hold the housing inner body in each of the first and second housing parts; and
    an annular spring element arranged between the housing inner body and the first and second housing parts, the annular spring element being held in a recess, the annular spring element being configured to brace the first and second housing parts against the housing inner body in order to press the rolling bodies against an associated raceway of the joint outer part,
    wherein the annular spring element is a single annular spring element extending around the housing inner body.

13. A rolling element of a tripod joint, the rolling element comprising:
    a housing with a first housing part;
    a second housing part;
    a housing inner body that is held between the first and second housing parts;
    a receptacle opening adapted to support a journal of a tripod star of the tripod joint;
    at least two rolling bodies associated with the first and second housing parts, the at least two rolling bodies being adapted to support mutually opposing raceways of a joint outer part of the tripod joint;
    a groove-like receptacle adapted to hold the housing inner body in each of the first and second housing parts; and
    an annular spring element arranged between the housing inner body and the first and second housing parts, the annular spring element being held in a recess, the annular spring element being configured to brace the first and second housing parts against the housing inner body in order to press the rolling bodies against an associated raceway of the joint outer part, the annular spring element arranged around the housing inner body,
    wherein the annular spring extends around an entire outer circumference of the housing inner body.

14. A rolling element of a tripod joint, the rolling element comprising:
    a housing with a first housing part;
    a second housing part;

a housing inner body that is held between the first and second housing parts;
a receptacle opening adapted to support a journal of a tripod star of the tripod joint;
at least two rolling bodies associated with the first and second housing parts, the at least two rolling bodies being adapted to support mutually opposing raceways of a joint outer part of the tripod joint;
a groove-like receptacle adapted to hold the housing inner body in each of the first and second housing parts; and
an annular spring element arranged between the housing inner body and the first and second housing parts, the annular spring element being held in a recess, the annular spring element being configured to brace the first and second housing parts against the housing inner body in order to press the rolling bodies against an associated raceway of the joint outer part, the annular spring element arranged around the housing inner body,
wherein the recess is disposed in the housing inner body.

15. A rolling element of a tripod joint, the rolling element comprising:
a first housing part;
a second housing part;
a housing inner body that is held between the first and second housing parts;
a receptacle opening adapted to support a journal of a tripod star of the tripod joint;
at least two rolling bodies associated with the first and second housing parts, the at least two rolling bodies being adapted to support mutually opposing raceways of a joint outer part of the tripod joint;
a groove-like receptacle adapted to hold the housing inner body in each of the first and second housing parts; and
a single annular spring element arranged between the housing inner body and the first and second housing parts, the annular spring element being held in a recess in the housing inner body, the annular spring element being configured to brace the first and second housing parts against the housing inner body in order to press the rolling bodies against an associated raceway of the joint outer part, the annular spring element arranged around an entire outer circumference of the housing inner body.

16. A rolling element, the rolling element comprising:
a first housing part;
a second housing part;
a housing inner body that is held between the first and second housing parts; and
an annular spring element arranged between the housing inner body and the first and second housing parts, the annular spring element being held in a recess formed in and encircling the housing inner body.

* * * * *